July 8, 1924.
A. PERCZEL
1,500,715
APPARATUS FOR THE TREATMENT OF SOLID SUBSTANCES IN A GASEOUS ATMOSPHERE
Filed Aug. 2, 1923
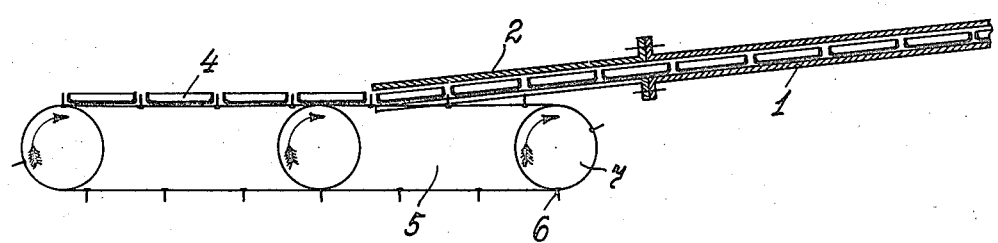
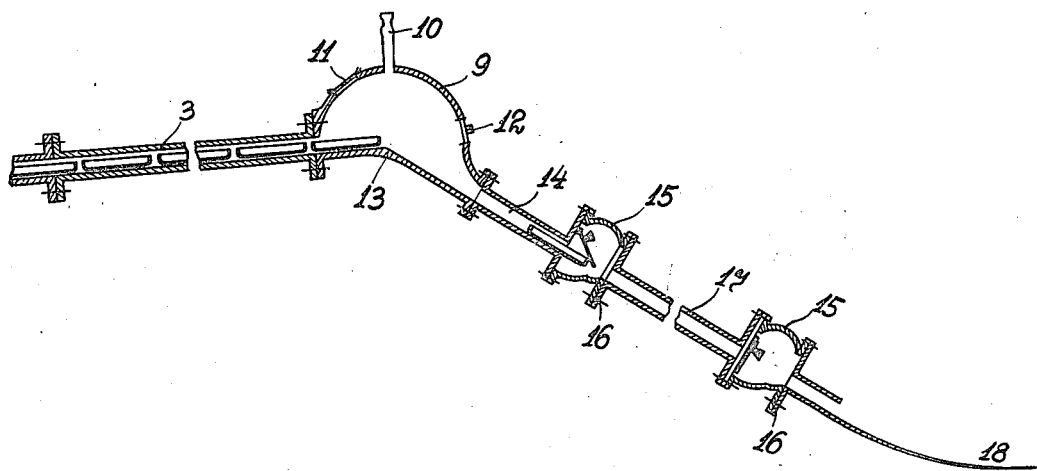
Inventor
A. Perczel
By Langner, Parry, Card + Langner
Attys.

Patented July 8, 1924.

1,500,715

UNITED STATES PATENT OFFICE.

ALADÁR PERCZEL, OF UJPEST, HUNGARY.

APPARATUS FOR THE TREATMENT OF SOLID SUBSTANCES IN A GASEOUS ATMOSPHERE.

Application filed August 2, 1923. Serial No. 655,383.

*To all whom it may concern:*

Be it known that I, ALADÁR PERCZEL, a citizen of Hungary, residing at Ujpest, Hungary, have invented certain new and useful Improvements in Apparatus for the Treatment of Solid Substances in a Gaseous Atmosphere, of which the following is a specification.

Both in laboratories and in large factories it is often necessary to treat—for instance to reduce, or to heat, or to oxidize or to chlorinate, etc.—solid substances in a gaseous atmosphere. The present invention relates to a process and to an apparatus which is more particularly suitable for treating such quantities of substances as are larger than those dealt with in laboratory practice, but smaller than those which have to be treated in large factories.

For the treatment of substances with gases in laboratories, for instance for the combustion of carbon-containing substances in oxygen, the substance was generally introduced in a tray into a glass or quartz tube through which oxygen could be passed. The object of the present invention is to convert such a gas treatment into a continuous one, and the substance of the invention consists in the trays or the like uniform open containers arranged in the treatment tube in a row direct in front of each other, being constantly or intermittently pushed towards the other end of the tube by a pressure exercised on the last tray introduced at one end of the tube, in a direction parallel to the axis of the tube.

An apparatus more particularly suitable for the reduction of metal oxides by means of hydrogen in a heated tube is shown by way of example in the accompanying drawing. The two parts of the drawing arranged under each other, must be assumed to be adjoining each other.

The quartz tube 1 heated in any desired manner, and the upper and lower extensions 2 or 3, form together the treatment tube through which the uniform trays 4 filled with the substance to be treated are to be conveyed in a continuous manner. To that end the trays are placed behind each other on a conveying device 5 arranged in front of, and below, the mouth of the lower tube extension 2, in the vertical plane passing through the axis of the treatment tube, so that the teeth 6 of the conveyor device engaging behind the rear walls of the single trays 4 push the trays in front of them into the mouth of the tube 2. The lower face (bottom) of the tube 2 is provided with a longitudinal slot which is narrower than the trays, but wider than the teeth 6, so that the teeth pushing the trays in front of them, can move forward in the slot and then turn round the wheel 7 out of the tube 2, whilst the trays which are wider than the slot, remain in the tube. The pressure exercised by the moving conveyor device on the tray which has been the last one to be pushed into the tube, pushes forward also the other trays already contained in the tube in front of the said tray. It is preferable to provide the front and rear ends of the trays with "pass" faces so that the pressure is always transmitted parallel to the axis of the tube.

After passing the heated tube 2, the trays pass into the cooling tube 3 in which they are cooled to the required temperature. The treatment tube 1, 2, 3 rises in the direction of the cooling tube so that the hydrogen introduced in the direction opposite to that of the movement of the trays, can easily displace the air from the tube. The cross-section of the trays is preferably made such that the hydrogen cannot flow freely towards the tube 2. To the upper end of the cooling tube 3 is connected a bell 9 which is provided with a tubular branch 10 intended for the introduction of the hydrogen, with a window 11 enabling the tray passing from the cooling tube into the bell to be watched, and with a closed cleaning opening 12. The track 13 provided for the trays in the bell, forms at first continuation of the bottom of the cooling tube 3 and passes then into a track with a gradient of an opposite direction which passes to the discharge pipe 14 connected to the bell. In that discharge pipe is inserted a lock chamber 17, the locks 16 of which are provided with automatic flap doors 15. The pipe end adjoining the bottom lock, passes into a horizontal track 18.

When the apparatus is to be utilized, hydrogen is forced constantly through the tubular branch 10 into the treatment and discharge tubes, and as soon as the air contained in the said tubes has been displaced, the tube 1 is heated to the desired temperature, and the filled trays placed on the conveyor device 5 are pushed by the latter, one after another, into the treatment tube. The speed of the conveyor device and of the gas current, as well as the temperature, are of course regulated in such a manner as to ensure that the contents of the trays passing from the heating tube 2 into the cooling tube 3 have the desired nature, which can be seen through the window 11. In the event of a tray breaking, or of the working being disturbed, the treatment tube can be cleaned through the opening 12. The gradient of the treatment tube is determined by two considerations. As regards the conveying, the gradient should be as small as possible in order to facilitate the pushing forward of the trays in the tube; on the other hand, the gradient must be at least so great that the hydrogen escaping from the lower tube 2 should prevent in a reliable manner any air from getting into the heating tube. But the gradient must never be so great as to bring about an automatic sliding back of the trays in the tube.

The cooled trays pushed on to the track 13 of the bell, finally turn over in the direction of the discharge tube and as the gradient of this tube ir made so great that the tray can slide in the tube by gravity, the tray sliding down in the tube 14 can open consecutively the flap doors 15 of the locks 16 and automatically pass on the horizontal track 18. The air that may have got into the lock chamber during the passage of the tray is expelled again by the constant current of hydrogen.

If it is desired to avoid an excessively steep arrangement of the discharge tube 17, a rolling track could be arranged in the tube, on which the cooled tray would slide down easily even in the case of a slight gradient.

As many changes could be made in the above construction and many apparently widely different embodiments of this invention could be made without departing from the scope thereof, it is intended that all matter contained in the above specification or shown in the accompanying drawing shall be interpreted as illustrative only and not in a limiting sense.

What I claim is:

1. In an apparatus for the treatment of solid substances in a gaseous atmosphere, the combination of a tubular vessel, a conveying device arranged in front of the one end of said tubular vessel and in the vertical plane passing through the axis of said tubular vessel, and means on that conveying device exerting a pressure in a direction parallel to the axis and towards the other end of the said tubular vessel.

2. In an apparatus for the treatment of solid substances in a gaseous atmosphere, the combination of a tubular vessel of an ascending gradient, a row of uniform containers, a conveying device arranged in front of the one end of said tubular vessel and in the vertical plane passing through the axis of said tubular vessel and means on that conveying device exerting a pressure in a direction parallel to the axis and towards the other end of the said tubular vessel.

3. In an apparatus for the treatment of solid substances in a gaseous atmosphere, the combination of a tubular vessel, one part having an ascending, and the other a descending gradient, a conveying device arranged in front of the one end of said tubular vessel and in the vertical plane passing through the axis of said tubular vessel, and means on that conveying device exerting a pressure in a direction parallel to the axis and towards the other end of the said tubular vessel.

4. In an apparatus for the treatment of solid substances in a gaseous atmosphere, the combination of a tubular vessel, one part of which is of an ascending and the other a descending gradient, means to heat a section of the ascending part, a conveying device arranged in front of the one end of said tubular vessel and in the vertical plane passing through the axis of said tubular vessel and means on that conveying device exerting a pressure in a direction parallel to the axis and towards the other end of the said tubular vessel.

5. In an apparatus for the treatment of solid substances in a gaseous atmosphere, the combination of a tubular vessel, one part of which is of an ascending and the other of a descending gradient, the latter being so great, that smooth bodies can slide in the descending part of the vessel by gravity, means to heat a section of the ascending part, a conveying device arranged in front of the one end of said tubular vessel and in the vertical plane passing through the axis of said tubular vessel and means on that conveying device exerting a pressure in a direction parallel to the axis and towards the other end of the said tubular vessel.

6. In an apparatus for the treatment of solid substances in a gaseous atmosphere, the combination of a tubular vessel, one part of which is of an ascending and the other of a descending gradient, the latter being so great that smooth bodies can slide in the descending part of the vessel by gravity, means to heat a section of the ascending part, locks with automatic gates in the descending part of the vessel, a conveying device arranged in front of the one end of said tubular vessel and in the vertical plane passing through the axis of said tubular vessel and means on that conveying device exerting a pressure in a direction parallel to the axis and toward the other end of the said tubular vessel.

7. In an apparatus for the treatment of solid substances in a gaseous atmosphere, the combination of a tubular vessel, a row of uniform containers, a conveying device arranged in front of the one slotted end of said tubular vessel and in the vertical plane passing through the axis of said tubular vessel, and means on that conveying device exerting a pressure in a direction parallel to the axis and towards the other end of the said tubular vessel, and moving on part of their way in the slot of said tubular vessel.

8. In an apparatus for the treatment of solid substances in a gaseous atmosphere, the combination of a tubular vessel, a row of uniform containers, a conveying device arranged in the vertical plane passing through the axis of said tubular vessel and in front of the one slotted end of said tubular vessel the slot being narrower than the breadth of the containers and means on the conveying device exerting a pressure in a direction parallel to the axis and towards the other end of the said tubular vessel.

9. In an apparatus for the treatment of solid substances in a gaseous atmosphere, the combination of a tubular vessel, one part of which has an ascending and the other a descending gradient, an extension of the tubular vessel at the meeting of the ascending and descending parts, a row of uniform containers, a conveying device arranged in front of the one end of said tubular vessel and in the vertical plane passing through the axis of said tubular vessel, and means on that conveying device exerting a pressure on the containers in a direction parallel to the axis and towards the other end of the said tubular vessel.

10. In an apparatus for the treatment of solid substances in a gaseous atmosphere, the combination of a tubular vessel, one part of which has an ascending and the other a descending gradient, an extension of the tubular vessel at the meeting of the ascending and descending parts, a window, a cleaning opening and a gas inlet in the wall of said extension, a row of uniform containers, a conveying device arranged in front of the one end of said tubular vessel and in the vertical plane passing through the axis of said tubular vessel, and means on that conveying device exerting a pressure on the containers in a direction parallel to the axis and towards the other end of the said tubular vessel.

In testimony whereof I affix my signature in presence of two witnesses.

ALADÁR PERCZEL.

Witnesses:
CHARLES MEDAYE,
EUGENE HAUSANN.